US012789095B2

(12) United States Patent
Lin et al.

(10) Patent No.: US 12,789,095 B2
(45) Date of Patent: Nov. 10, 2026

(54) EVENT EXECUTION METHOD AND APPARATUS IN GAME, ELECTRONIC DEVICE AND STORAGE MEDIUM

(71) Applicant: NETEASE (HANGZHOU) NETWORK CO., LTD., Hangzhou (CN)

(72) Inventors: Shouwei Lin, Hangzhou (CN); Peng Wang, Hangzhou (CN); Shuai Qiao, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 414 days.

(21) Appl. No.: 18/556,384

(22) PCT Filed: Nov. 2, 2021

(86) PCT No.: PCT/CN2021/128272
§ 371 (c)(1),
(2) Date: Apr. 12, 2024

(87) PCT Pub. No.: WO2022/222417
PCT Pub. Date: Oct. 27, 2022

(65) Prior Publication Data

US 2024/0269560 A1 Aug. 15, 2024

(30) Foreign Application Priority Data

Apr. 22, 2021 (CN) ......................... 202110438262.6

(51) Int. Cl.
*A63F 13/56* (2014.01)
*A63F 13/2145* (2014.01)
(Continued)

(52) U.S. Cl.
CPC .......... *A63F 13/56* (2014.09); *A63F 13/2145* (2014.09); *A63F 13/42* (2014.09);
(Continued)

(58) Field of Classification Search
CPC ...... A63F 13/2145; A63F 13/25; A63F 13/40; A63F 13/42; A63F 13/426; A63F 13/44;
(Continued)

(56) References Cited

U.S. PATENT DOCUMENTS 6,299,535 B1 * 10/2001 Tanaka .................... A63F 13/45
463/31
8,641,529 B2 * 2/2014 Bronstein .............. G06Q 50/34
463/25
(Continued)

FOREIGN PATENT DOCUMENTS

CN 106488789 A 3/2017
CN 110124321 A 8/2019
(Continued)

OTHER PUBLICATIONS

International Search Report dated Jan. 29, 2022 of International Application No. PCT/CN2021/128272.
(Continued)

*Primary Examiner* — Omkar A Deodhar
(74) *Attorney, Agent, or Firm* — Qinghong Xu

(57) ABSTRACT

An execution method for an event in a game includes determining, according to an execution result of a first game character on a target task, a target character camp to which the first game character belongs; target tasks of the first game character are different in different seasons; and the target character camp includes a first camp or a second camp; determining, according to the target character camp, a target interaction event to be executed by the first game character; interaction events corresponding to different char-
(Continued)

acter camps are different; and controlling, in response to a first interaction instruction for the first game character, the first game character to execute the target interaction event.

18 Claims, 4 Drawing Sheets

(51) Int. Cl.
*A63F 13/42* (2014.01)
*A63F 13/533* (2014.01)
*A63F 13/822* (2014.01)
*A63F 13/86* (2014.01)

(52) U.S. Cl.
CPC .......... *A63F 13/533* (2014.09); *A63F 13/822* (2014.09); *A63F 13/86* (2014.09)

(58) Field of Classification Search
CPC .......... A63F 13/45; A63F 13/47; A63F 13/48; A63F 13/50; A63F 13/533; A63F 13/537; A63F 13/5372; A63F 13/5378; A63F 13/55; A63F 13/56; A63F 13/58; A63F 13/70; A63F 13/79; A63F 13/822; A63F 13/86; A63F 2300/1075; A63F 2300/30; A63F 2300/303; A63F 2300/306; A63F 2300/5533; A63F 2300/554; A63F 2300/5546; A63F 2300/5553; A63F 2300/556; A63F 2300/57; A63F 2300/60; A63F 2300/609; A63F 2300/61; A63F 2300/632; A63F 2300/638; A63F 2300/65; A63F 2300/66; A63F 2300/6623
See application file for complete search history.

(56) References Cited

U.S. PATENT DOCUMENTS

2004/0209684 A1* 10/2004 Hisano .................... A63F 13/10 463/32
2009/0017886 A1* 1/2009 McGucken ............. A63F 13/60 463/1
2009/0325711 A1* 12/2009 Bronstein ............... A63F 13/48 463/42
2010/0075761 A1* 3/2010 Lord ........................ A63F 13/10 463/43
2013/0196728 A1* 8/2013 Yasue ................... A63F 13/327 463/31
2014/0378230 A1* 12/2014 Suzuki .................. A63F 13/822 463/42
2018/0250598 A1 9/2018 Trombetta et al.
2019/0168112 A1* 6/2019 Hawk ..................... A63F 13/67
2019/0262724 A1* 8/2019 Trombetta ............ A63F 13/798

FOREIGN PATENT DOCUMENTS

| | | | |
|---|---|---|---|
| CN | 110935174 | A | 3/2020 |
| CN | 111672110 | A | 9/2020 |
| CN | 111888761 | A | 11/2020 |
| CN | 111905377 | A | 11/2020 |
| CN | 112044072 | A | 12/2020 |
| CN | 112337089 | A | 2/2021 |
| CN | 113117312 | A | 7/2021 |
| JP | 5830815 | B1 | 12/2015 |
| JP | 2021029871 | A | 3/2021 |
| KR | 20050091438 | A | 9/2005 |
| KR | 20130082733 | A | 7/2013 |
| KR | 20150021380 | A | 3/2015 |
| WO | 2014136466 | A1 | 9/2014 |

OTHER PUBLICATIONS

Notice of Allowance dated Dec. 15, 2023 for Chinese Application No. 202110438262.6.
1st Office Action dated Nov. 19, 2024 of Japanese Application No. 2023-563891.
Devil Survivor 2 Official Guidebook, 1st edition, published on Aug. 9, 2011, P45,92,146,158,159.

* cited by examiner

EVENT EXECUTION METHOD AND APPARATUS IN GAME, ELECTRONIC DEVICE AND STORAGE MEDIUM

CROSS-REFERENCE TO RELATED APPLICATION

The present application is the U.S. national phase application of PCT Application No. PCT/CN2021/128272, filed on Nov. 2, 2021, which claims the priority to the Chinese patent application No. 202110438262.6, entitled "EVENT EXECUTION METHOD AND APPARATUS IN GAME, ELECTRONIC DEVICE AND STORAGE MEDIUM", filed on Apr. 22, 2021, the entire contents of which are incorporated herein by reference in their entireties.

TECHNICAL FIELD

The present disclosure relates to the technical field of games, and particularly, to an execution method and apparatus for an event in a game, an electronic device and a storage medium.

BACKGROUND

In some common games, especially, in massive multiplayer online role-playing games (MMORPGs), players may establish their own guilds in the game, and invite the player they like to join their own guilds. In the guild, the players may form groups freely and participate in the guild tasks daily issued by the game system, and in the teamwork, the sense of immersion of a player for the game is enhanced.

In current methods, the guilds in the game are in an equal relationship, the game system may not treat members from different guilds differently, and the players mostly establish social relationships in the game with other players in the guild by joining the guild. Even if a player selects to change the guild to which the player belongs, the guild tasks that the player can perform in the guild may not change. In this way, there is a problem that the game tasks are rigid, causing that the attractiveness of the game to players decreases as gaming time goes by, resulting in a reduction in the efficiency of human-machine interaction, a loss of a large number of players, and easy occurrence of the game server being consumed for nothing, which may lead to a reduction in the utilization rate of resources in the game server.

SUMMARY

In a first aspect, the embodiments of the present disclosure provide an execution method for an event in a game. The game includes a first game character, and the execution method includes:

determining, according to an execution result of the first game character on a target task, a target character camp to which the first game character belongs; target tasks of the first game character are different in different seasons; and the target character camp includes a first camp or a second camp;

determining, according to the target character camp to which the first game character belongs, a target interaction event to be executed by the first game character; interaction events corresponding to different types of character camps are different; and controlling, in response to a first interaction instruction for the first game character, the first game character to execute the target interaction event.

In the second aspect, the embodiments of the present disclosure provide an execution apparatus for an event in a game. The game includes a first game character, and the execution apparatus includes:

- a camp determination module, configured to determine, according to an execution result of the first game character on a target task, a target character camp to which the first game character belongs; target tasks of the first game character are different in different seasons; and the target character camp includes a first camp or a second camp;
- an event determination module, configured to determine, according to the target character camp to which the first game character belongs, a target interaction event to be executed by the first game character; interaction events corresponding to different types of character camps are different; and
- a character control module, configured to control, in response to a first interaction instruction for the first game character, the first game character to execute the target interaction event.

In the third aspect, the embodiments of the present disclosure provide a computer device. The computer device includes a processor, a memory and a computer program that is stored in the memory and is capable of being executed by the processor. The processor, through executing the computer program, performs the steps of the foregoing execution method for an event in a game.

In the fourth aspect, the embodiments of the present disclosure provide a computer-readable storage medium. The computer-readable storage medium stores a computer program. The computer program, when executed by a processor, performs the steps of the foregoing execution method for an event in a game.

In order to make the foregoing purpose, features and advantages of the present disclosure more obvious and understandable, the detailed description is made as follows by specially citing preferred embodiments and in conjunction with the accompanying drawings.

BRIEF DESCRIPTION OF THE DRAWINGS

In order to more clearly illustrate the technical solutions of the embodiments of the present disclosure, the accompanying drawings need to be used in the embodiments are briefly introduced below. It should be understood that the following accompanying drawings only illustrate some embodiments of the present disclosure, and therefore should not be considered as limitations of the scope. For those skilled in the art, other related drawings may also be obtained based on these drawings without creative effort.

DETAILED DESCRIPTION

Figure 1:
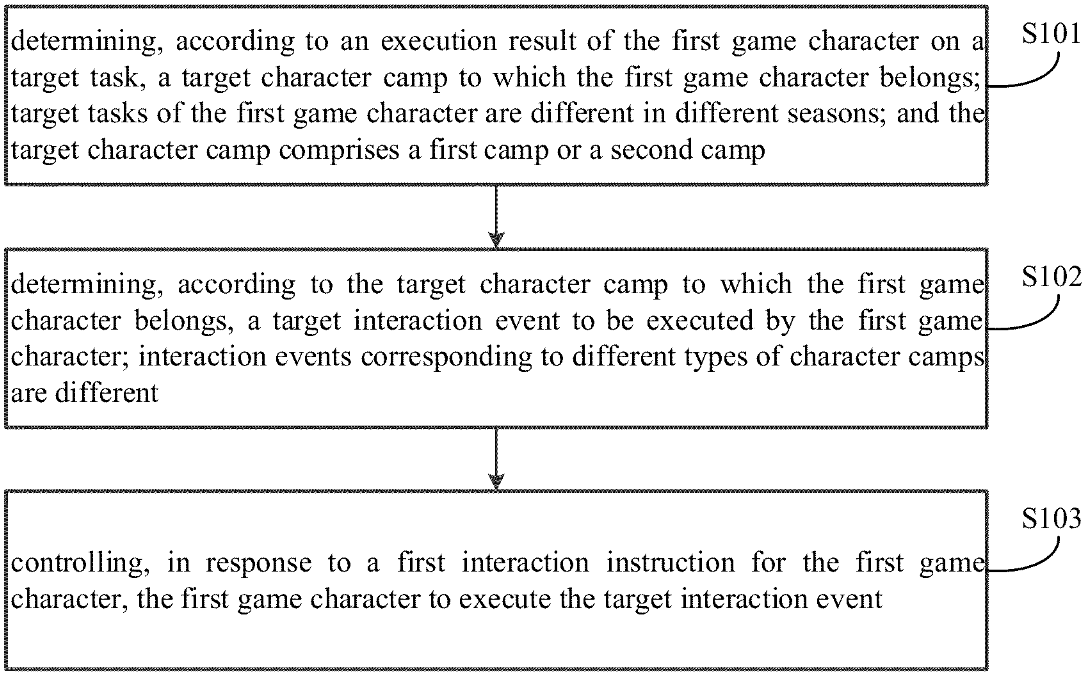
FIG. 1 shows a schematic flow chart of an execution method for an event in a game provided by an embodiment of the present disclosure.

In order to make the purposes, technical solutions and advantages of the embodiments of the present disclosure clearer, the technical solutions in the embodiments of the present disclosure will be clearly and completely described below in conjunction with the accompanying drawings in the embodiments of the present disclosure. It should be understood that the drawings in the present disclosure are only for the purpose of illustration and description, and are not used to limit the protection scope of the present disclosure. In addition, it should be understood that the schematic drawings are not drawn to scale. The flow charts used in the present disclosure illustrate operations implemented according to some embodiments of the present disclosure. It should be understood that the operations of the flow charts may be implemented out of order, and steps in contexts that have no logical relationships may be implemented in reverse order or concurrently. Further, those skilled in the art may add one or more other operations to a flow chart, or remove one or more operations from a flow chart under the guidance of the present disclosure.

In addition, the described embodiments are only some of the embodiments of the present disclosure, but not all of them. Generally, the assemblies of the embodiments of the present disclosure described and illustrated in the accompanying drawings here may be arranged and designed in a variety of different configurations. Accordingly, the following detailed description of the embodiments of the present disclosure provided for the accompanying drawings is not intended to limit the scope that the present disclosure claims, but merely represents selected embodiments of the present disclosure. Based on the embodiments of the present disclosure, all other embodiments obtained by those skilled in the art without creative efforts shall fall within the protection scope of the present disclosure.

It should be noted that the term "include" that will be used in the embodiments of the present disclosure is used to indicate the existence of the features stated later, but does not exclude the addition of other features.

In massive multiplayer online role-playing games (MMORPGs), players may establish their own guilds in the game or select to join other guilds. In the guild, the players may form groups freely and participate in the game tasks daily issued by the game system. The guilds in the game are in an equal relationship, the game system may not treat members from different guilds differently, and the players mostly establish social relationships in the game with other players in the guild by joining the guild. Even if a player selects to change the guild to which the player belongs, the game tasks that the player can perform in the guild may not change. In this way, there is a problem that the types of game tasks are rigid, causing that the attractiveness of the game to players decreases as gaming time goes by, resulting in a loss of a large number of players, a reduction in the efficiency of human-machine interaction, and easy occurrence of the game server being consumed for nothing, which may lead to a waste of resources in the game server.

Based on this, embodiments of the present disclosure provide an execution method and apparatus for an event in a game, an electronic device, and a storage medium. Players belonging to different character camps are configured with different interaction permissions, so that game characters belonging to different character camps can perform different types of interaction events, the diversification and richness of the game tasks are increased, the attractiveness of the game to players is improved, and thus the efficiency of human-computer interaction is improved. At the same time, the utilization rate of the resources in the game server is improved.

An execution method for an event in a game in one of the embodiments of the present disclosure may be run on a terminal device or a server. The terminal device may be a local terminal device. When the execution method for an event in a game is run on a server, the method can be implemented and performed based on a cloud interaction system. The cloud interaction system includes a server and a client device (i.e., a terminal device).

In an optional embodiment, various cloud applications, e.g., cloud games, may be run under the cloud interaction system. Taking the cloud game as an example, a cloud game refers to a game mode based on cloud computing. In the operation mode of the cloud game, the operation subject of the game program and the presentation subject of the gaming footage are separated, and the storage and operation of the execution method for an event in a game are completed on the cloud game server. The client device is used for data reception, data transmission and presentation of the gaming footage. For example, the client device may be a display device with a data transmission function near the user side, such as a mobile terminal, TV, computer, PDA, etc. However, the terminal device for processing the information is the cloud game server in the cloud. When the game is performed, the player operates the client device to send an operation instruction to the cloud game server. The cloud game server runs the game according to the operation instruction, encodes and compresses data such as the gaming footage, and returns the data to the client device via network; and finally, the client device decodes the data and outputs the gaming footage.

In an optional embodiment, the terminal device may be a local terminal device. Taking a game as an example, the local terminal device stores the game program, which is used for presenting the gaming footage. The local terminal device is used for interacting with the player through the graphical user interface, i.e., routinely downloading and installing the game program via the electronic device and running the game program on the electronic device. The local terminal device may provide the graphical user interface to the player in a variety of ways. For example, the graphical user interface may be rendered on a display of the terminal; alternatively, the graphical user interface may be provided to the player by holographic projection. For example, the local terminal device may include a display and a processor. The display is configured for presenting the graphical user interface. The graphical user interface includes the gaming footage. The processor is configured for running the game, generating the graphical user interface, and controlling the display of the graphical user interface on the display.

To facilitate the understanding of the present embodiment, an execution method for an event in a game provided by an embodiment of the present disclosure will be described in detail below.

As shown in FIG. 1, an execution method for an event in a game provided by an embodiment of the present disclosure is provided. The game includes a first game character, and the execution method includes the following steps S101 to S103.

At step S101, a target character camp to which the first game character belongs is determined according to an execution result of the first game character on a target task. Target tasks of the first game character are different in different seasons. The target character camp includes a first camp or a second camp.

At step S102, a target interaction event to be executed by the first game character is determined according to the target character camp to which the first game character belongs. Interaction events corresponding to different types of character camps are different.

At step S103, the first game character is controlled to execute the target interaction event in response to a first interaction instruction for the first game character.

Through the foregoing execution method for an event in a game provided by the embodiments of the present disclosure, the target character camp to which the first game character belongs is first determined according to the execution result of the first game character on the target task; the target interaction event to be executed by the first game character is determined according to the target character camp to which the first game character belongs; and the first game character is controlled to execute the target interaction event in response to the interaction instruction of the player for the first game character. The interaction events corresponding to different types of character camps are different. In this way, players belonging to different character camps are configured with different interaction permissions, so that the game characters belonging to different character camps can perform different types of interaction events, the diversification and richness of the game tasks are increased, the attractiveness of the game to players is improved, and thus the efficiency of human-computer interaction is improved. At the same time, the utilization rate of the resources in the game server is improved.

The foregoing exemplary steps provided by the embodiments of the present disclosure are described below.

At step S101, a target character camp to which the first game character belongs is determined according to an execution result of the first game character on a target task. Target tasks of the first game character are different in different seasons. The target character camp includes a first camp or a second camp.

The game background of the game involved in the embodiments of the disclosure is as below. Two character camps (i.e., guilds) are preset in the game, which are respectively the first camp and the second camp; game characters in different character camps have different interaction permissions, and the interaction permission that a player character in the first camp has is higher than the interaction permission that a player character in the second camp has. The two character camps in the game are in an asymmetric structure. The second camp includes a plurality of independent organizations. The player characters belonging to the second camp may select to join the target organization themselves, and each organization corresponds to one organization leader (i.e., an organization boss). The first camp has no branch structure, and the first camp corresponds to one camp boss.

Moreover, season tasks corresponding to different character camps are different. For example, in the game, the first camp may be a defending camp, and the second camp may be an attacking camp; in each season, the second camp takes defeating the first camp as the season task, and correspondingly, and the first camp takes defending against the second camp as the season task. According to the battle result of the current season, the side that wins the battle is determined as the first camp of the next season.

The first game character in the embodiments of the present disclosure is a game character controlled by a player. The target task refers to an interaction event executed by the first game character in the game. Through the execution result of the first game character on the interaction event, the character camp of the first game character can be changed (i.e., the identity attribute of the first game character can be changed); in addition, the game season can also be updated. In this way, the diversification and richness of the game are increased, the attractiveness of the game to players is improved. At the same time, the utilization rate of the resources in the game server is improved. Combined with the foregoing game background, the target task in the embodiments of the present disclosure may be divided into the following two situations:

(1) the target task being an initial interaction event to be executed by the first game character; or (2) the target task being an invitation task sent by the second game character belonging to the first camp.

In the first situation, as an optional embodiment, the determining, according to the execution result of the first game character on the target task, the target character camp to which the first game character belongs includes:

determining, in response to the first game character completing the initial interaction event, that the first game character belongs to the second camp. The initial interaction event is determined according to an initial character camp to which the first game character belongs. The initial character camp is determined when the first game character first joins the game, or is determined according to a battle result of a current season.

Specifically, when the first game character enters the game for the first time, the identity attribute of the first game character is of a neutral side identity, which neither belongs to the second camp nor the first camp; at this time, it may be determined that the initial character camp to which the first game character belongs is: no camp. As an optional embodiment, "going to a designated non-player-character (NPC) and receiving a character trial task" may be taken as the initial interaction event to be executed by the first game character with no camp. After the first game character completes the character trial task, it is determined that the first game character joins the second camp; and after the first game character joins the second camp, the identity attribute of the first game character is changed into an attacking side identity.

When the first game character is not entering the game for the first time, according to the battle result of the first game character in the last season, it may be determined that the first game character being defeated in the last season is of a neutral side identity in the current season; and at this time, it may be understood that the initial character camp to which the first game character belongs is: no camp. It is determined that the first game character that wins in the last season is of a defending side identity in the current season; and at this time, it may be understood that the initial character camp that the first game character belongs to is the first camp. At this point, as an optional embodiment, when the initial character camp to which the first game character belongs is the first camp, it may be directly determined that the target character camp to which the first game character belongs is the first camp.

In the second situation, as an optional embodiment, the determining, according to the execution result of the first game character on the target task, the target character camp to which the first game character belongs includes:

determining, in response to the first game character accepting the invitation task sent by the second game character belonging to the first camp, that the first game character belongs to the first camp.

Specifically, combined with the foregoing game background, it can be seen that the first camp has the highest interaction permission in the game, therefore after the start of a new season, the second game character belonging to the first camp may send an invitation task to the first game character not belonging to the first camp, and when the first game character accepts the invitation task, it is determined that the first game character joins the first camp.

At step S102, a target interaction event to be executed by the first game character is determined according to the target character camp to which the first game character belongs. Interaction events corresponding to different types of character camps are different.

Combined with the foregoing game background, it can be seen that game characters in different character camps have different interaction permissions. Therefore, in the embodiments of the present disclosure, the interaction events corresponding to different types of character camps are also different.

For an exemplary description, if a player character belonging to the first camp has the interaction permission to execute the target interaction event A and the target interaction event B, then when the first game character belongs to the second camp, the first game character cannot execute the target interaction event A or the target interaction event B.

Specifically, in the new season, when the target character camp to which the first game character belongs changes, the interaction permission of the first game character in the game changes, and the target interaction event that the first game character can execute in the game may also changes accordingly, and therefore in different seasons, different interaction experiences are brought to a player, the diversification and richness of the game tasks are increased, the attractiveness of the game to players is improved, and thus the efficiency of human-machine interaction is improved. At the same time, the utilization rate of the resources in the game server is improved.

It should be noted that the target interaction event in step S102 refers to all the interaction events and game tasks that the first game character can execute in the game, that is, the target interaction event in step S102 also includes the target task in step S101.

At step S103, the first game character is controlled to execute the target interaction event in response to a first interaction instruction for the first game character.

It should be noted that various instructions mentioned in the embodiments of the present disclosure may be direct operation instructions made by a player to the terminal device through touch and the like, or indirect operation instructions made by a player to the terminal device through voice, gesture, and the like, which is not limited in the present disclosure.

In step S102 of the embodiments of the present disclosure, when the first game character belongs to the second camp, as an optional embodiment, the target interaction events that the first game character can execute may be divided into: the interaction event of joining or exiting an organization, the season task of the current season, and the target game task in the game. The foregoing three types of target interaction events are described below.

First, the determined target interaction event to be executed by the first game character is the interaction event of joining or exiting an organization.

The target interaction event is the interaction event of joining an organization.

Figure 2:
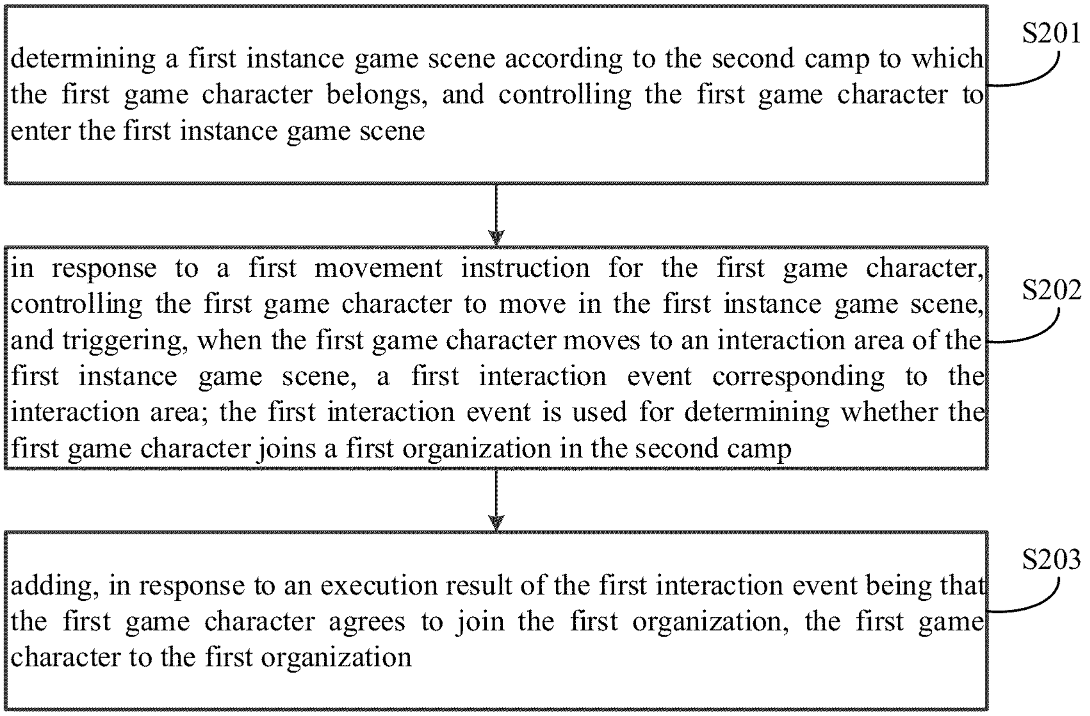
FIG. 2 shows a schematic flow chart of a method for joining a target organization in a second camp provided by an embodiment of the present disclosure.

As shown in FIG. 2, in the embodiments of the present disclosure, the determining, according to the target character camp to which the first game character belongs, the target interaction event to be executed by the first game character includes the following steps S201 to S203.

At step S201, a first instance game scene is determined according to the second camp to which the first game character belongs, and the first game character is controlled to enter the first instance game scene.

Specifically, the first instance game scene is an instance game scene in which the interaction permission is only open to the player character belonging to the second camp. Each organization in the second camp corresponds to an independent interaction area in the first instance game scene. When the first game character belongs to the second camp, the player may control the first game character to enter the first instance game scene, so as to interact with the target organization in the first instance game scene. In the first instance game scene, the first game character may select to directly join the target organization, or select to exit the organization that the first game character currently belongs to and then join the target organization. The target organization is the organization that the player corresponding to the first game character wants to join.

As an optional embodiment, in the embodiments of the present disclosure, the first game character may be controlled to enter the first instance game scene according to the following manner:

in response to a touch operation for a designated task control or a first non-player character, if touch time of the touch operation meets a first preset condition, determining the first instance game scene according to the second camp to which the first game character belongs, and controlling the first game character to enter the first instance game scene.

For exemplary description, in the game, the first instance game scene may only be open to the player character belonging to the second camp within a specified time period, and at this time, the first preset condition may be the opening time corresponding to the first instance game scene. For example, if the first instance game scene is open to the player characters belonging to the second camp on Wednesday and Friday every week, in response to the touch operation for the designated task control or the first non-player character, it is judged whether the touch time of the touch operation is within the opening time corresponding to the first instance game scene; if the touch time of the touch operation belongs to Wednesday or Friday, the player may control the first game character to enter the first instance game scene; and if the touch time of the touch operation belongs to Monday and is not within the opening time corresponding to the first instance game scene, the player cannot control the first game character to enter the first instance game scene even if the first game character belongs to the second camp.

Specifically, the designated task control or the first non-player character in the foregoing embodiments is equivalent to a scene transmission entrance corresponding to the first instance game scene, and the first game character is transferred to the first instance game scene by responding to the touch operation of the player to the scene transmission entrance.

It should be noted that the designated task control may be a specific function control in the game, the first non-player character may be one NPC character in a target game scene in the game, or one target building in the target game scene. The target game scene may be a game scene corresponding to a main plot task in the game, or a game scene corresponding to an instance plot task in the game. The specific existence form of the scene transmission entrance corresponding to the first instance game scene is not limited in the present disclosure.

At step S202, in response to a first movement instruction for the first game character, the first game character is controlled to move in the first instance game scene, and when the first game character moves to the interaction area of the first instance game scene, a first interaction event corresponding to the interaction area is triggered. The first interaction event is used for determining whether the first game character joins a first organization in the second camp.

Combined with the description of step S201, it can be seen that each organization in the second camp corresponds to one independent interaction area in the first instance game scene, and after entering the first instance game scene, the player may control the first game character to move in the first instance game scene.

In the embodiments of the present disclosure, the first organization is the organization that the player wants to join; and the interaction area includes one of:

a first preset area where the first organization is located; or a second preset area where a bulletin board is located, the bulletin board includes key information of all organizations in the second camp.

(1) When the first game character moves into the first preset area where the first organization is located:

a first interaction interface is displayed in the first instance game scene. The first interaction interface includes organization key information of the first organization and one organization joining control. The player may view the organization key information of the first organization through the first interaction interface, and trigger the first interaction event through the organization joining control.

(2) When the first game character moves into the second preset area where the bulletin board is located:

a second interaction interface corresponding to the bulletin board is displayed in the first instance game scene. The second interaction interface includes: organization key information of all organizations in the second camp, and organization joining controls corresponding to respective organizations. The player may view the organization key information of all organizations through the second interaction interface, and trigger the first interaction event through the organization joining control corresponding to the first organization.

At step S203, the first game character is added to the first organization in response to an execution result of the first interaction event being that the first game character agrees to join the first organization.

Combined with step S202, the two types of divisions of the interaction area are specifically as following:

(1) in the first preset area, in response to the touch operation of the player on the organization joining control in the first interaction interface, it is determined that the first game character agrees to join the first organization, and the first game character is added to the first organization.

(2) in the second preset area, in response to the touch operation of the player for the organization joining control corresponding to the first organization in the second interaction interface, it is determined that the first game character agrees to join the first organization, and the first game character is added to the first organization.

The target interaction event is: the interaction event of exiting an organization.

Combined with the description of steps S201 to S203, it can be seen that when the first game character belongs to the second camp but does not join any organization in the second camp, the first game character may be controlled to join the first organization according to the execution method described in steps S201 to S203; and as for the player character who has joined an organization, in the foregoing interaction area in the first instance game scene, the player character may also select to exit the organization that the player character currently belongs to and join other organization.

Figure 3:
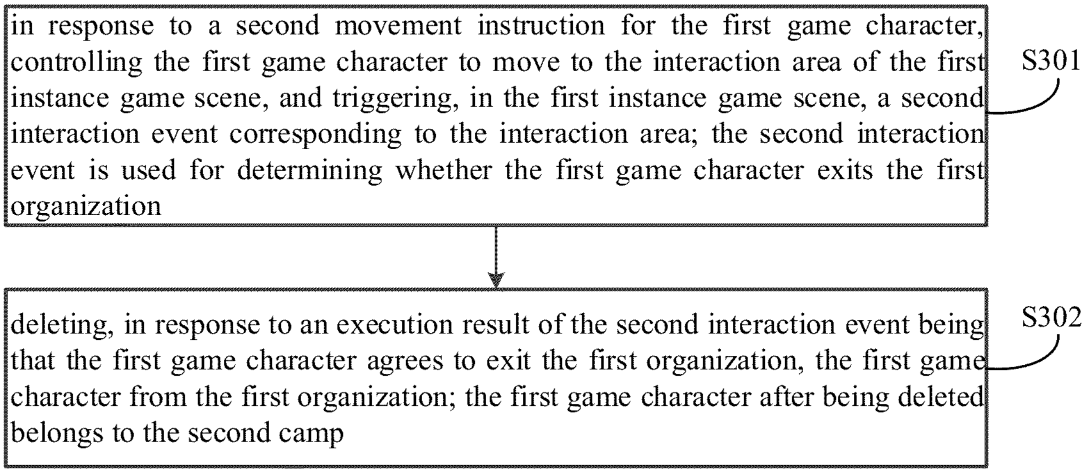
FIG. 3 shows a schematic flow chart of a method for exiting a target organization in a second camp provided by an embodiment of the present disclosure.

Taking the first game character as an example, as shown in FIG. 3, in the embodiments of the present disclosure, after the first game character is added to the first organization, the execution method further includes the following steps S301 to S302.

At step S301, in response to a second movement instruction for the first game character, the first game character is controlled to move to the interaction area of the first instance game scene, and a second interaction event corresponding to the interaction area is triggered in the first instance game scene. The second interaction event is used for determining whether the first game character exits the first organization.

At step S302, the first game character is deleted from the first organization in response to an execution result of the second interaction event being that the first game character agrees to exit the first organization. The first game character after being deleted belongs to the second camp.

Specifically, combined with steps S301 to S302, after the first game character joins the first organization, the player may control the first game character to move in the first instance game scene, when the first game character moves into the foregoing first preset area, since the first game character has joined the first organization and there is no repeated joining, as an alternative embodiment, an organization exiting control may be displayed to the first game character in the first interaction interface and an organization joining control may be displayed to other game characters not belonging to the first organization. At this time, in response to the touch operation of the player for the organization exiting control in the first interaction interface, it is determined that the first game character agrees to exit the first organization, and the first game character is deleted from the first organization.

When the first game character moves into the foregoing second preset area, based on the same reason as above, as an optional embodiment, an organization exiting control corresponding to the first organization may be displayed to the first game character in the second interaction interface, and organization joining controls corresponding to other organizations may be displayed to the first game character in the second interaction interface; at this time, in response to the touch operation of the player for the organization exiting control in the second interaction interface, it is determined that the first game character agrees to exit the first organization, and the first game character is deleted from the first organization; and after the first game character is deleted, it may be continued that in response to the touch operation of the first game character for the organization joining controls corresponding to other organizations, it is determined that the first game character joins other organization.

It should be noted that considering that the two target character camps in the game are established according to an asymmetric structure, different character camps have different interaction permissions and obtain different information in the game, and therefore, when the first game character belongs to the second camp, the first game character may exit an organization in the second camp freely, but the first game character after exiting still belongs to the second camp.

Second, the determined target interaction event to be executed by the first game character is: the season task of the current season.

Combined with the description in the foregoing game background section, it can be seen that the season task corresponding to the second camp is: defeating the first camp; and specifically, in the game, when the second camp meets the start condition of the season task, the second camp and the first camp may be respectively informed to battle in accordance with a preset season task rule; and according to the battle result, the side that wins the battle is determined as the first camp of the next season.

In the embodiments of the present disclosure, when the first game character belongs to the second camp, for the situation in which the target interaction event is the season task of the current season, the specific target interaction event that the first game character can perform in the season task of the current season may be determined in the following two ways.

Figure 4:
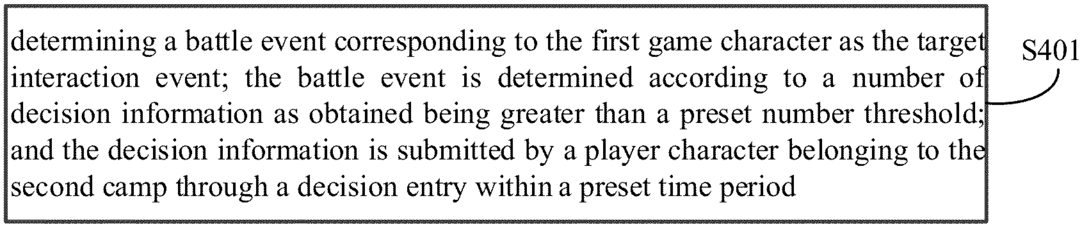
FIG. 4 shows a schematic diagram of a method for determining a target interaction event provided by an embodiment of the present disclosure.

1. When the first game character belongs to the second camp and the first game character meets the second preset condition:

as shown in FIG. 4, in the embodiments of the present disclosure, the determining, according to the target character camp to which the first game character belongs, the target interaction event to be executed by the first game character further includes the following step S401.

At step S401, a battle event corresponding to the first game character is determined as the target interaction event. The battle event is determined according to a number of decision information as obtained being greater than a preset number threshold; and the decision information is submitted by a player character belonging to the second camp through a decision entry within a preset time period.

In the embodiments of the present disclosure, a decision entry is open to the player character belonging to the second camp within a preset time period, and decision information submitted by each player character through the decision entry is obtained. The decision information is used for indicating that the player character agrees to start the season task of the current season on time in accordance with the season settlement time in the game; after the preset time period is over, the number of decision information as obtained is counted and if the number of the decision information as obtained is greater than a preset number threshold, it is determined to start the season task of the current season on time; and prompt information is sent to the first camp to remind the first camp to participate in the season task on time.

Specifically, the second preset condition includes: the first game character belonging to the second organization in the second camp. A battle power ranking of the second organization is within a preset ranking range. The second preset condition further includes the first game character being selected.

Since the second camp includes a plurality of independent organizations, after the season task of the current season is determined to start on time, it also needs to determine, according to the battle power rankings of respective organizations, that the organization with a battle power ranking within the preset ranking range has the interaction permission to battle with the first camp in the season task.

As for the organization having the foregoing interaction permission, the boss of the organization needs to select, in the organization, the player character to battle with the first camp, and therefore, when the first game character meets the foregoing second preset condition, it is indicated that the first game character has the interaction permission to battle with the first camp in the season task, and it is determined that the specific target interaction event that the first game character can execute in the season task of the current season is: the battle event.

Specifically, after it is determined that the specific target interaction event that the first game character can execute is the battle event, the execution method further includes:

determining, when the first game character wins the battle event, a third organization that the first game character joins as a first camp of a next season. The third organization is one organization in the second camp.

For exemplary description, if the first game character wins the battle event, the third organization that the first game character joins is determined as the first camp of the next season. At the beginning stage of the next season, the initial character camps of other player characters in the current season except for the third organization are uniformly configured as: no camp, the target character camps are re-divided according to the execution method described in accordance with steps S101 to S103, and a new season is dynamically started.

Figure 5:
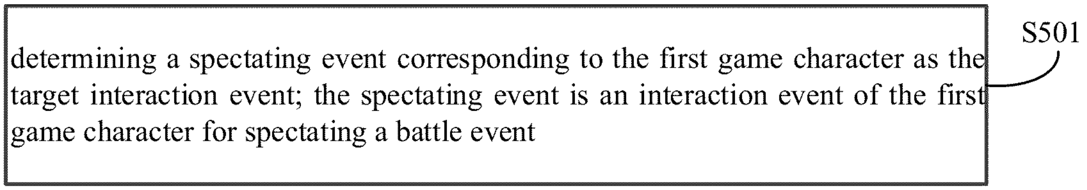
FIG. 5 shows a schematic flow chart of another method for determining a target interaction event provided by an embodiment of the present disclosure.

2. When the first game character belongs to the second camp and the first game character does not meet the second preset condition:

as shown in FIG. 5, in the embodiments of the present disclosure, the determining, according to the target character camp to which the first game character belongs, the target interaction event to be executed by the first game character further includes the following step S501.

At step S501, a spectating event corresponding to the first game character is determined as the target interaction event. The spectating event is an interaction event of the first game character for spectating a battle event.

Combined with step S401, if the first game character does not meet the second preset condition, it is indicated that the first game character does not have the interaction permission to battle with the first camp in the season task; and at this time, as an optional embodiment, it may be determined that the specific target interaction event that the first game character can execute in the season task of the current season is: the spectating event, so as to indicate that the first game character has the interaction permission to spectate the battle between the two camps in the season task, but does not have the interaction permission to battle with the first camp in the season task.

Third, the determined target interaction event to be executed by the first game character is: the target game task in the game.

Figure 6:
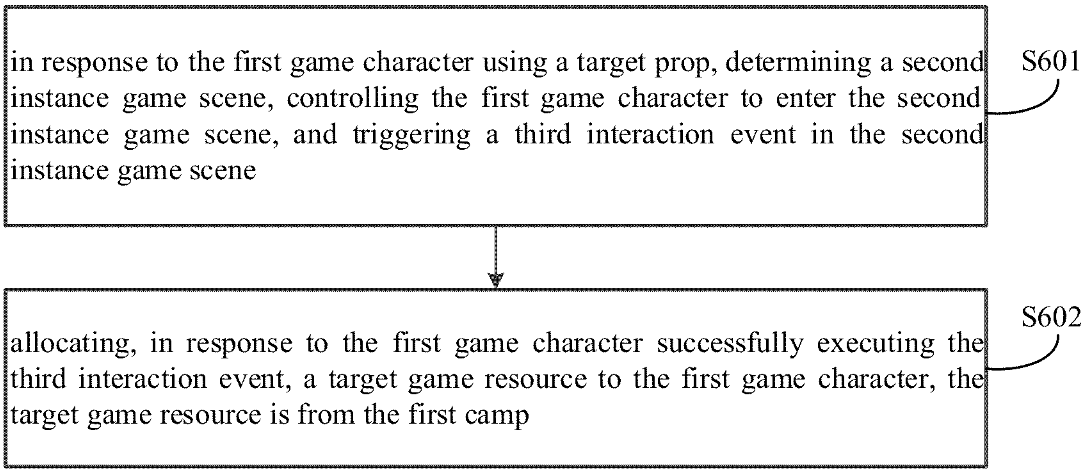
FIG. 6 shows a schematic flow chart of another method for determining a target interaction event provided by an embodiment of the present disclosure.

As shown in FIG. 6, in the embodiments of the present disclosure, the determining, according to the target character camp to which the first game character belongs, the target interaction event to be executed by the first game character further includes the following steps S601 to S602.

At step S601, in response to the first game character using a target prop, a second instance game scene is determined, the first game character is controlled to enter the second instance game scene, and a third interaction event is triggered in the second instance game scene.

Combined with the foregoing game background section, it can be seen that the interaction permission that a player character in the first camp has is higher than the interaction permission that a player character in the second camp has. Specifically, in a feasible embodiment, the game resource obtained by the player character belonging to the first camp in the game will be greater than the game resource obtained by the player character belonging to the second camp in the game.

It should be noted that the foregoing game resource may be a game data resource such as game experience value and game economic value obtained when the player logs in the game, or a game prop resource such as game equipment obtained by a player character through killing a non-player character in the game, which is not limited in the present disclosure.

In the embodiments of the present disclosure, since the first camp in the game has a richer game resource, when the first game character belongs to the second camp, the first game character may use the target prop, enter the second instance game scene corresponding to the target prop, execute the target game task in the second instance game scene, and snatch the game resource belonging to the first camp; and at this time, the target game task executed by the first game character is the third interaction event as triggered.

At step S602, in response to the first game character successfully executing the third interaction event, a target game resource is allocated to the first game character. The target game resource is from the first camp.

Combined with step S601, the player controls the first game character to execute the target game task in the second instance game scene, and when the first game character successfully completes the target game task, it is determined that the first game character has successfully snatched the target game resource belonging to the first camp, the target game resource is re-allocated to the first game character, and the target game resource is deleted from the collective game resource of the first camp.

Figure 7:
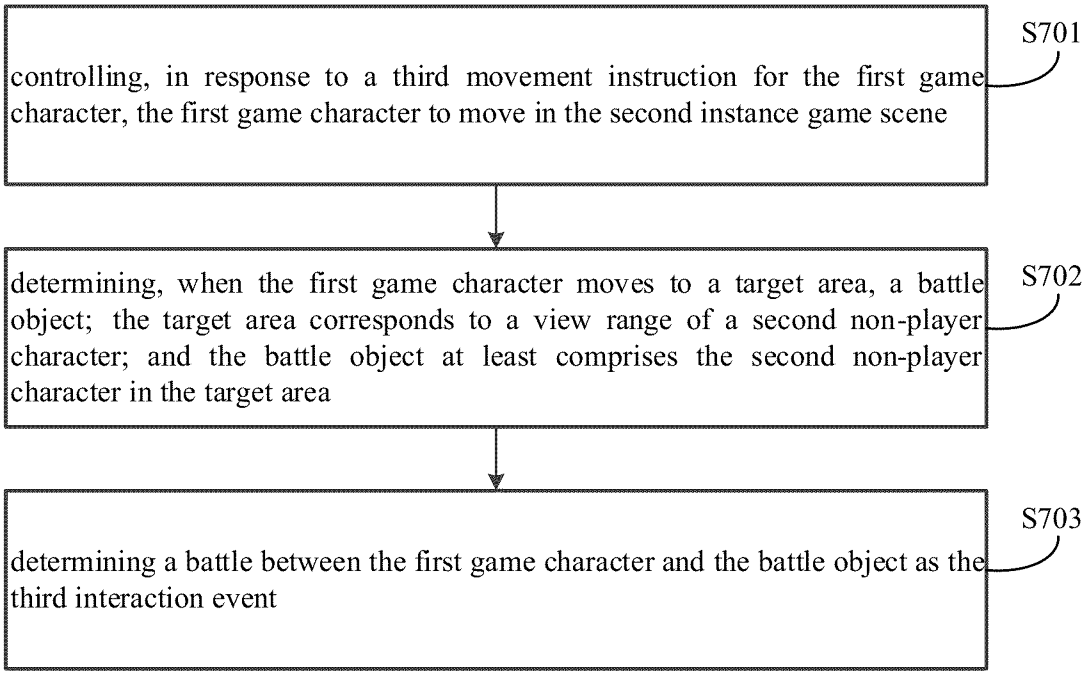
FIG. 7 shows a schematic flow chart of a method for determining a third interaction event provided by an embodiment of the present disclosure.

In step S601, as shown in FIG. 7, in the embodiments of the present disclosure, the triggering the third interaction event in the second instance game scene includes the following steps S701 to S703.

At step S701, in response to a third movement instruction for the first game character, the first game character is controlled to move in the second instance game scene.

In the embodiments of the present disclosure, the second instance game scene includes at least one virtual prop. Each virtual prop corresponds to one target game resource, and each virtual prop corresponds to one second non-player character for guarding. The player controls the first game character to move in the second instance game scene, so as to evade the monitoring and attack of the second non-player character, and snatch the target game resource in the virtual prop.

At step S702, a battle object is determined when the first game character moves to a target area. The target area corresponds to a view range of a second non-player character; and the battle object includes at least the second non-player character in the target area.

In the embodiments of the present disclosure, the battle object further includes at least one third game character, and the third game character belongs to the first camp. The third game character is a player character, with a ranking greater than a preset threshold, entering the second instance game scene after receiving support information sent by the second non-player character.

Specifically, when the first game character moves into the view range of the second non-player character, the second non-player character may send support information to all player characters belonging to the first camp, requesting the player character of the first camp to enter the second instance game scene as a battle object, and support the second non-player character.

Upon sending the support information to all player characters belonging to the first camp, the second non-player character may enter a loading status, and when all the support information has been sent, the second non-player character may end the loading status and resume the attack on the first game character. When the second non-player character is in the loading status, the player may control the first game character to attack the second non-player character, and if the first game character has successfully killed the second non-player character before the second non-player character ends the loading status, the first game character may directly obtain the target game resource in the virtual prop guarded by the second non-player character.

At step S703, a battle between the first game character and the battle object is determined as the third interaction event.

Specifically, in the embodiments of the present disclosure, a maximum number of player characters of the battle objects may be preset. For example, up to 4 third game characters belonging to the first camp may be accepted, in accordance with the order of entering the second instance game scene, as the battle objects to enter the second instance game scene to battle; and the battle between the first game character and each battle object is determined as the third interaction event.

When the first game character successfully executes the third interaction event, it is determined that the first game character wins the target game task, and the target game resource is allocated to the first game character.

When the first game character fails to execute the third interaction event, it is determined that the first game character fails to win the target game task, and the target game resource is still kept in the virtual prop, waiting for other player characters to continue to execute the target game task. The target game resource in the virtual prop still belongs to the first camp.

In step S102 of the embodiments of the present disclosure, when the first game character belongs to the first camp, as an optional embodiment, the target interaction event that the first game character can execute may be divided into: the interaction event of exiting or joining the first camp, the season task of the current season, and the target game task in the game; and the foregoing three types of target interaction events are described below.

First, the determined target interaction event to be executed by the first game character is: the interaction event of exiting or joining the first camp.

As an optional embodiment, when the first game character belongs to the first camp, the player controlling the first game character may send an exiting information to the boss of the first camp and select to exit the first camp at any time node. The initial character camp to which the first game character that exits the first camp belongs is determined as: no camp; and at this time, the first game character may continue to execute various interaction events in the game according to the execution method of the foregoing steps S101 to S103.

The first game character after exiting the first camp may still accept the invitation task sent by the second game character belonging to the first camp, and rejoin the first camp.

Second, the determined target interaction event to be executed by the first game character is: the season task of the current season.

Figure 8:
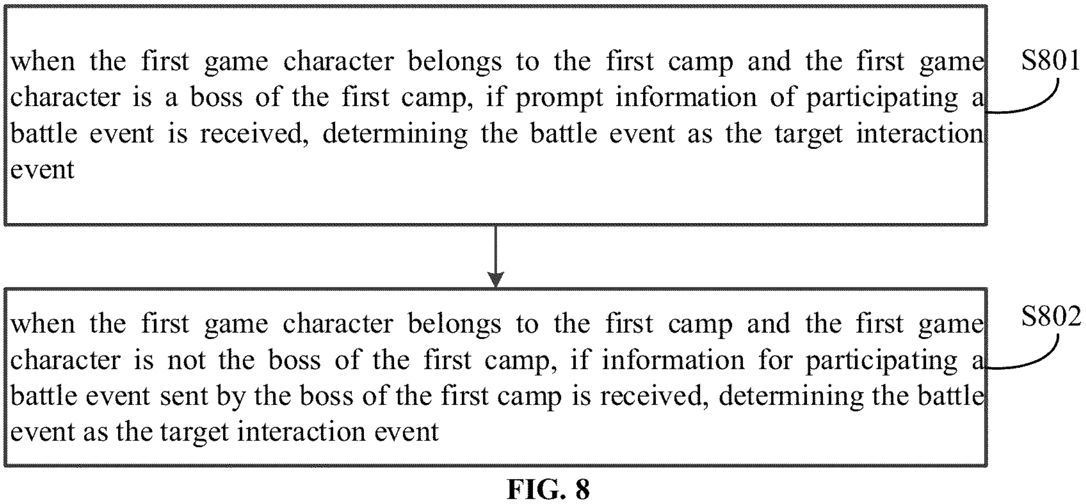
FIG. 8 shows a schematic diagram of another method for determining a target interaction event provided by an embodiment of the present disclosure.

As shown in FIG. 8, in the embodiments of the present disclosure, the determining, according to the target character camp to which the first game character belongs, the target interaction event to be executed by the first game character further includes the following steps S801 to S802.

At step S801, when the first game character belongs to the first camp and the first game character is a boss of the first camp, if prompt information of participating a battle event is received, the battle event is determined as the target interaction event.

In the embodiments of the present disclosure, after it is determined that the season task of the current season starts on time, when the first game character is the boss of the first camp, the first game character may receive the prompt information of participating the battle event. The first game character has the highest interaction permission in the game. As the boss of the first camp, the first game character not only has the interaction permission to directly participate the battle event, the first game character may also select, in accordance with a preset quota to battle, the player character to participate the battle from all the player characters belonging to the first camp. The selected player character has the interaction permission to battle with the second camp in the season task.

At step S802, when the first game character belongs to the first camp and the first game character is not the boss of the first camp, if information for participating a battle event sent by the boss of the first camp is received, the battle event is determined as the target interaction event.

Specifically, combined with step S801, when the first game character is not the boss of the first camp, if the boss of the first camp selects the first game character, the first game character may receive the information for participating the battle event sent by the boss of the first camp, and the first game character has the interaction permission to battle with the second camp in the season task.

If the boss of the first camp does not select the first game character, the first game character may not receive the information for participating the battle event sent by the boss of the first camp, and the first game character has the interaction permission to spectate the battle between the two camps in the season task, but does not have the interaction permission to battle with the second camp in the season task.

Third, the determined target interaction event to be executed by the first game character is: the target game task in the game.

Combined with steps S701 to S703, it can be seen that the situation in which the first game character executes the target game task when the first game character belongs to the first camp is opposite to the situation in which the first game character executes the target game task when the first game character belongs to the second camp, which is not elaborated here.

Through the foregoing execution method for an event in a game provided by the embodiments of the present disclosure, the target character camp to which the first game character belongs is first determined according to the execution result of the first game character on the target task; the target interaction event to be executed by the first game character is then determined according to the target character camp to which the first game character belongs; and in response to the interaction instruction of the player for the first game character, the first game character is controlled to execute the target interaction event. The interaction events corresponding to different types of character camps are different. In this way, the players belonging to different character camps are configured with different interaction permissions, so that the game characters belonging to different character camps can perform different types of interaction events, the diversification and richness of the game tasks are increased, the attractiveness of the game to players is improved, and thus the efficiency of human-computer interaction is improved; at the same time, the utilization rate of the resources in the game server is improved.

Based on the same inventive concept, the present disclosure also provides an execution apparatus corresponding to the foregoing execution method for an event in the game. Since the problem-solving principle of the execution apparatus in the embodiments of the present disclosure is similar to that of the foregoing execution method for an event in a game of the embodiments of the disclosure, the implementation of the execution apparatus may refer to the implementation of the foregoing execution method, and the repetitions will not be repeated again here.

Figure 9:
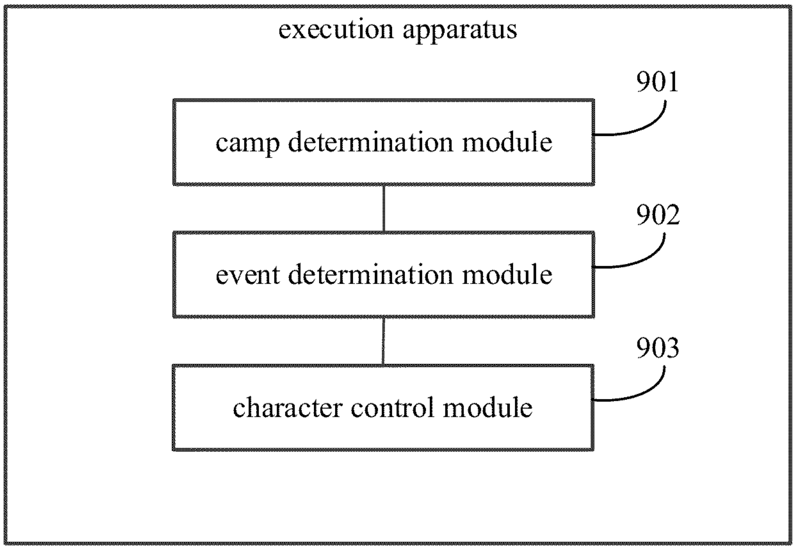
FIG. 9 shows a schematic structural diagram of an execution apparatus for an event in a game provided by an embodiment of the present disclosure.

Referring to FIG. 9, FIG. 9 shows a structural schematic diagram of an execution apparatus for an event in a game provided by an embodiment of the present disclosure. The game includes a first game character, and the execution apparatus includes:

a camp determination module 901, configured to determine, according to an execution result of the first game character on a target task, a target character camp to which the first game character belongs; target tasks of the first game character are different in different seasons; the target character camp includes a first camp or a second camp;

an event determination module 902, configured to determine, according to the target character camp to which the first game character belongs, a target interaction event to be executed by the first game character; interaction events corresponding to different types of character camps are different; and a character control module 903, configured to control, in response to a first interaction instruction for the first game character, the first game character to execute the target interaction event.

Optionally, the target task is an initial interaction event to be executed by the first game character; and the camp determination module 901 is specifically configured to:

determine, in response to the first game character completing the initial interaction event, that the first game character belongs to the second camp; the initial interaction event is determined according to an initial character camp to which the first game character belongs; and the initial character camp is determined when the first game character first joins the game, or is determined according to a battle result of a current season.

Optionally, the target task is an invitation task sent by a second game character belonging to the first camp; and the camp determination module 901 is specifically configured to:

determine, in response to the first game character accepting the invitation task sent by the second game character belonging to the first camp, that the first game character belongs to the first camp.

Optionally, the event determination module 902 includes:

a first transmission module (not shown in the figure), configured to: determine a first instance game scene according to the second camp to which the first game character belongs, and control the first game character to enter the first instance game scene;

a first interaction module (not shown in the figure), configured to: in response to a first movement instruction for the first game character, control the first game character to move in the first instance game scene, and trigger, when the first game character moves to an interaction area of the first instance game scene, a first interaction event corresponding to the interaction area; the first interaction event is used for determining whether the first game character joins a first organization in the second camp; and a second interaction module (not shown in the figure), configured to: add, in response to an execution result of the first interaction event being that the first game character agrees to join the first organization, the first game character to the first organization.

Optionally, the first transmission module is specifically configured to:

in response to a touch operation for a designated task control or a first non-player character, if touch time of the touch operation meets a first preset condition, determine the first instance game scene according to the second camp to which the first game character belongs, and control the first game character to enter the first instance game scene.

Optionally, the interaction area includes one of:

a first preset area where the first organization is located; or a second preset area where a bulletin board is located, the bulletin board includes key information of all organizations in the second camp.

Optionally, after the first game character is added to the first organization, the second interaction module is further configured to:

in response to a second movement instruction for the first game character, control the first game character to move to the interaction area of the first instance game scene, and trigger, in the first instance game scene, a second interaction event corresponding to the interaction area; where the second interaction event is used for determining whether the first game character exits the first organization; and delete, in response to an execution result of the second interaction event being that the first game character agrees to exit the first organization, the first game character from the first organization; where the first game character after being deleted belongs to the second camp.

Optionally, the event determination module 902 is further configured to:

determine, when the first game character belongs to the second camp and the first game character meets a second preset condition, a battle event corresponding to the first game character as the target interaction event; where the battle event is determined according to a number of decision information as obtained being greater than a preset number threshold; the decision information is submitted by a player character belonging to the second camp through a decision entry within a preset time period.

Optionally, the second preset condition includes: the first game character belonging to a second organization in the second camp; where a battle power ranking of the second organization is within a preset ranking range; and the first game character being selected.

Optionally, the event determination module 902 is specifically configured to:

determine, when the first game character belongs to the second camp and the first game character does not meet the second preset condition, a spectating event corresponding to the first game character as the target interaction event; where the spectating event is an interaction event of the first game character for spectating a battle event.

Optionally, the event determination module 902 is specifically configured to:

when the first game character belongs to the first camp and the first game character is a boss of the first camp, if prompt information of participating a battle event is received, determine the battle event as the target interaction event; and when the first game character belongs to the first camp and the first game character is not the boss of the first camp, if information for participating a battle event sent by the boss of the first camp is received, determine the battle event as the target interaction event.

Optionally, after the first game character is controlled to execute the target interaction event, the character control module 903 is further configured to:

determine, when the first game character wins the battle event, a third organization that the first game character joins as a first camp of a next season; where the third organization is one organization in the second camp.

Optionally, when the first game character belongs to the second camp, the event determination module 902 specifically includes:

a third interaction module (not shown in the figure), configured to: in response to the first game character using a target prop, determine a second instance game scene and control the first game character to enter the second instance game scene, and trigger a third interaction event in the second instance game scene; and a fourth interaction module (not shown in the figure), configured to: allocate, in response to the first game character successfully executing the third interaction event, a target game resource to the first game character, where the target game resource is from the first camp.

Optionally, the third interaction module is specifically configured to:

control, in response to a third movement instruction for the first game character, the first game character to move in the second instance game scene;

determine a battle object when the first game character moves to a target area;

where the target area corresponds to a view range of a second non-player character; and the battle object at least includes the second non-player character in the target area; and determine a battle between the first game character and the battle object as the third interaction event.

Optionally, the battle object further includes at least one third game character belonging to the first camp; where the third game character is a player character, with a ranking greater than a preset threshold, entering the second instance game scene after receiving support information sent by the second non-player character.

Optionally, when the first game character belongs to the first camp, a game resource obtained by the first game character in the game will be greater than a game resource obtained by a fourth game character in the game, and the fourth game character belongs to the second camp.

Through the foregoing execution method for an event in a game provided by the embodiments of the present disclosure, the target character camp to which the first game character belongs is first determined according to the execution result of the first game character on the target task; the target interaction event to be executed by the first game character is then determined according to the target character camp to which the first game character belongs; and in response to the interaction instruction of the player for the first game character, the first game character is controlled to execute the target interaction event. The interaction events corresponding to different types of character camps are different. In this way, the players belonging to different character camps are configured with different interaction permissions, so that the game characters belonging to different character camps can perform different types of interaction events, the diversification and richness of the game tasks are increased, the attractiveness of the game to players is improved, and thus the efficiency of human-computer interaction is improved; at the same time, the utilization rate of the resources in the game server is improved.

Figure 10:
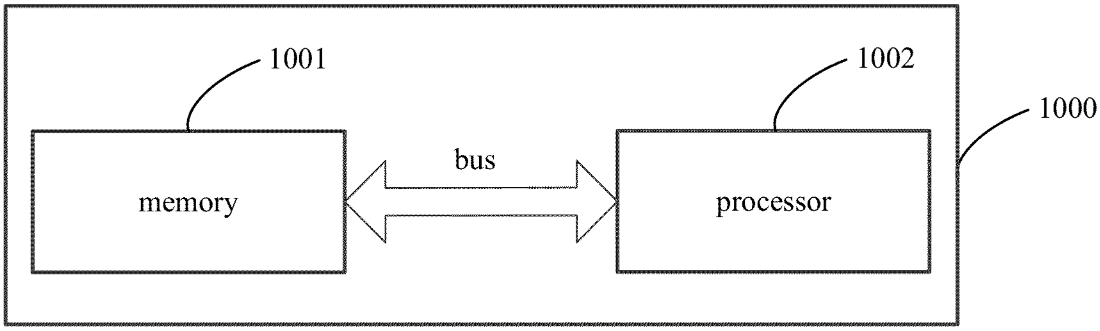
FIG. 10 is a schematic structural diagram of a computer device provided by an embodiment of the present disclosure.

As shown in FIG. 10, an embodiment of the present disclosure provides a computer device 1000 for executing the execution method for an event in a game in the present disclosure. The device includes a memory 1001, a processor 1002, and a computer program that is stored in the memory 1001 and is capable of being executed by the processor 1002. The foregoing processor 1002, through executing the foregoing computer program, performs the steps of the foregoing execution method for an event in a game.

Specifically, the foregoing memory 1001 and processor 1002 may be the general-purpose memory and processor, which is not specifically limited here. The processor 1002, when executing the computer program stored in the memory 1001, is capable of performing the foregoing execution method for an event in a game.

Corresponding to the execution method for an event in a game in the present disclosure, an embodiment of the present disclosure also provides a computer-readable storage medium. The computer-readable storage medium stores a computer program. The computer program, when executed by a processor, performs the steps of the foregoing execution method for an event in a game.

Specifically, the storage medium may be a general-purpose storage medium, such as a removable disk, a hard disk, etc. When a computer program in the storage medium is executed, the foregoing execution method for an event in a game may be performed.

In the embodiments provided in the present disclosure, it should be understood that the disclosed system and method may be implemented in other ways. The system embodiments described above are only illustrative. For example, the division of the unit is only a logical function division, and there may be other division manners in actual implementation. For another example, a plurality of units or components may be combined or integrated into another system, or some features may be omitted or not performed. In another point, the mutual coupling, direct coupling or communication connection shown or discussed may be through some communication interfaces, and the indirect coupling or communication connection between systems or units may be in electrical, mechanical or other forms.

The units described as separate components may or may not be physically separated, and the components shown as units may or may not be physical units, that is, they may be located in one place, or may be distributed to multiple network units. Part or all of the units may be selected according to actual needs to achieve the purpose of the solution of the embodiments of the present disclosure.

In addition, each functional unit in the embodiments provided in the present disclosure may be integrated into one processing unit, or each unit may physically exist separately, or two or more units may be integrated into one unit.

If the functions described are realized in the form of software functional unit and sold or used as independent product, they may be stored in a computer-readable storage medium. Based on this understanding, the essence of the technical solution of the present disclosure or the part that contributes to the prior art or the part of the technical solution may be embodied in the form of software product. The computer software product is stored in a storage medium, and includes several instructions to enable a computer device (which may be a personal computer, a server, or a network device, etc.) to perform all or part of the steps of the methods described in various embodiments of the present disclosure. The foregoing storage media include various media that may store a program code such as a U disk, mobile hard disk, read-only memory (ROM), random access memory (RAM), magnetic disk, optical disk or the like.

It should be noted that similar numerals and letters denote similar items in the following drawings, therefore once an item is defined in one drawing, it does not need to be further defined and explained in subsequent drawings. Furthermore, the terms "first", "second", "third" and the like are merely used to differentiate description and should not be construed as indicating or implying relative importance.

Finally, it should be noted that the foregoing embodiments are only specific implementation of the present disclosure, and are used to illustrate the technical solutions of the present disclosure, rather than limit them, and the protection scope of the present disclosure is not limited thereto. Although the present disclosure has been described in detail with reference to the foregoing embodiments, those ordinary skilled in the art should understand that, within the technology scope disclosed in the present disclosure, any skilled familiar with the technical field may still modify the technical solutions recorded in the foregoing embodiments or may easily think of changes, or equivalently replace some of the technical features; and these modifications, changes or replacements do not cause the essence of the corresponding technical solutions deviate from the spirit and scope of the technical solutions of the embodiments of the present disclosure and should be covered within the protection scope of the present disclosure. Therefore, the protection scope of the present disclosure should be determined by the protection scope of the claims.

What is claimed is:

1. An execution method for an event in a game, wherein the game comprises a first game character, and the execution method comprises:

determining, by a terminal device according to an execution result of the first game character on a target task, a target character camp to which the first game character belongs; wherein the first game character is controlled through the terminal device, target tasks of the first game character are different in different seasons; and the target character camp comprises a first camp or a second camp;

determining, by the terminal device according to the target character camp, a target interaction event to be executed by the first game character; wherein interaction events corresponding to different character camps are different; and controlling, by the terminal device in response to a first interaction instruction for the first game character, the first game character to execute the target interaction event; wherein the determining the target interaction event comprises: in response to the first game character belonging to the second camp and the first game character using a target prop, determining a second instance game scene, controlling the first game character to enter the second instance game scene, and triggering a third interaction event in the second instance game scene;

the execution method further comprises: allocating, in response to the first game character successfully executing the third interaction event, a target game resource to the first game character, wherein the target game resource is from the first camp; and the triggering the third interaction event in the second instance game scene comprises:

controlling, in response to a third movement instruction for the first game character, the first game character to move in the second instance game scene;

determining, in response to the first game character moving to a target area of the second instance game scene, a battle object; wherein the target area corresponds to a view range of a second non-player character; and the battle object at least comprises the second non-player character in the target area; and determining a battle between the first game character and the battle object as the third interaction event.

2. The execution method according to claim 1, wherein the target task is an initial interaction event to be executed by the first game character; and the determining the target character camp comprises:

determining, in response to the first game character completing the initial interaction event, that the first game character belongs to the second camp; wherein the initial interaction event is determined according to an initial character camp to which the first game character belongs; and the initial character camp is determined when the first game character first joins the game, or is determined according to a battle result of a current season.

3. The execution method according to claim 1, wherein the target task is an invitation task sent by a second game character belonging to the first camp; and the determining the target character camp comprises:

determining, in response to the first game character accepting the invitation task, that the first game character belongs to the first camp.

4. The execution method according to claim 1, wherein the determining the target interaction comprises:

determining a first instance game scene according to the second camp to which the first game character belongs, and controlling the first game character to enter the first instance game scene; and in response to a first movement instruction for the first game character, controlling the first game character to move in the first instance game scene, and triggering, when the first game character moves to an interaction area of the first instance game scene, a first interaction event corresponding to the interaction area; wherein the first interaction event is used for determining whether the first game character joins a first organization in the second camp; and the execution method further comprises:

adding, in response to an execution result of the first interaction event being that the first game character agrees to join the first organization, the first game character to the first organization.

5. The execution method according to claim 4, wherein the determining the first instance game scene comprises:

determining, in response to touch time of a touch operation for a designated task control or a first non-player character meeting a first preset condition, the first instance game scene according to the second camp.

6. The execution method according to claim 4, wherein the interaction area comprises one of:

a first preset area where the first organization is located; or a second preset area where a bulletin board is located, wherein the bulletin board comprises key information of all organizations in the second camp.

7. The execution method according to claim 4, further comprising:

in response to a second movement instruction for the first game character, controlling the first game character to move to the interaction area of the first instance game scene, and triggering, in the first instance game scene, a second interaction event corresponding to the interaction area;

wherein the second interaction event is used for determining whether the first game character exits the first organization; and deleting, in response to an execution result of the second interaction event being that the first game character agrees to exit the first organization, the first game character from the first organization; wherein the first game character after being deleted belongs to the second camp.

8. The execution method according to claim 1, wherein the determining the target interaction event further comprises:

determining, in response to the first game character belonging to the second camp and the first game character meeting a second preset condition, a battle event corresponding to the first game character as the target interaction event; wherein the battle event is determined according to a number of pieces of decision information as obtained being greater than a preset number threshold; and the decision information is submitted by a player character belonging to the second camp through a decision entry within a preset time period.

9. The execution method according to claim 8, wherein the second preset condition comprises:

the first game character belonging to a second organization in the second camp; wherein a battle power ranking of the second organization is within a preset ranking range; and the first game character being selected for participating the battle event.

10. The execution method according to claim 8, wherein the determining the target interaction event further comprises:

determining, in response to the first game character belonging to the second camp and the first game character not meeting the second preset condition, a spectating event corresponding to the first game character as the target interaction event; wherein the spectating event is an interaction event of the first game character for spectating a battle event.

11. The execution method according to claim 8, wherein the determining the target interaction event further comprises:

determining, in response to the first game character belonging to the first camp, the first game character being a boss of the first camp, and prompt information of participating a battle event being received by the first game character, the battle event indicated by the prompt information as the target interaction event; and determining, in response to the first game character belonging to the first camp, the first game character being not the boss of the first camp, and information for participating a battle event sent by the boss of the first camp being received by the first game character, the battle event indicated by the information for participating the battle event as the target interaction event.

12. The execution method according to claim 8, further comprising:

determining, in response to the first game character winning the battle event, a third organization that the first game character joins as a first camp of a next season; wherein the third organization is one organization in the second camp.

13. The execution method according to claim 1, wherein the battle object further comprises at least one third game character belonging to the first camp; wherein the third game character is a player character, with a ranking greater than a preset threshold, entering the second instance game scene after receiving support information sent by the second non-player character.

14. The execution method according to claim 1, wherein the first game character belongs to the first camp, a game resource obtained by the first game character in the game is greater than a game resource obtained by a fourth game character in the game, and the fourth game character belongs to the second camp.

15. An electronic device, comprising a processor, a memory and a bus, wherein the memory stores a machine-readable instruction executable by the processor, the processor communicates with the memory through the bus, and the processor, through executing the machine-readable instruction, is configured to:

determine, by the electronic device according to an execution result of the first game character on a target task, a target character camp to which the first game character belongs; wherein the first game character is controlled through the electronic device, target tasks of the first game character are different in different seasons; and the target character camp comprises a first camp or a second camp;

determine, by the electronic device according to the target character camp, a target interaction event to be executed by the first game character; wherein interaction events corresponding to different character camps are different; and control, by the electronic device in response to a first interaction instruction for the first game character, the first game character to execute the target interaction event; wherein the processor is specifically configured to: in response to the first game character belonging to the second camp and the first game character using a target prop, determine a second instance game scene, control the first game character to enter the second instance game scene, and trigger a third interaction event in the second instance game scene;

the processor is further configured to: allocate, in response to the first game character successfully executing the third interaction event, a target game resource to the first game character, wherein the target game resource is from the first camp; and the processor is specifically configured to:

control, in response to a third movement instruction for the first game character, the first game character to move in the second instance game scene;

determine, in response to the first game character moving to a target area of the second instance game scene, a battle object; wherein the target area corresponds to a view range of a second non-player character; and the battle object at least comprises the second non-player character in the target area; and determine a battle between the first game character and the battle object as the third interaction event.

16. A non-transitory computer-readable storage medium, wherein a computer program is stored on the computer-readable storage medium, and the computer program, when run by a processor of an electronic device, causes the electronic device to perform an execution method for an event in a game, wherein the game comprises a first game character, and the execution method comprises:

determining, by the electronic device according to an execution result of the first game character on a target task, a target character camp to which the first game character belongs; wherein the first game character is controlled through the electronic device, target tasks of the first game character are different in different seasons; and the target character camp comprises a first camp or a second camp;

determining, by the electronic device according to the target character camp, a target interaction event to be executed by the first game character; wherein interaction events corresponding to different character camps are different; and controlling, by the electronic device in response to a first interaction instruction for the first game character, the first game character to execute the target interaction event; wherein the determining the target interaction event comprises: in response to the first game character belonging to the second camp and the first game character using a target prop, determining a second instance game scene, controlling the first game character to enter the second instance game scene, and triggering a third interaction event in the second instance game scene;

the execution method further comprises: allocating, in response to the first game character successfully executing the third interaction event, a target game resource to the first game character, wherein the target game resource is from the first camp; and the triggering the third interaction event in the second instance game scene comprises:

controlling, in response to a third movement instruction for the first game character, the first game character to move in the second instance game scene;

determining, in response to the first game character moving to a target area of the second instance game scene, a battle object; wherein the target area corresponds to a view range of a second non-player character; and the battle object at least comprises the second non-player character in the target area; and determining a battle between the first game character and the battle object as the third interaction event.

17. The electronic device according to claim 15, wherein the target task is an initial interaction event to be executed by the first game character, and the processor, through executing the machine-readable instruction, is specifically configured to:

determine, in response to the first game character completing the initial interaction event, that the first game character belongs to the second camp; wherein the initial interaction event is determined according to an initial character camp to which the first game character belongs; and the initial character camp is determined when the first game character first joins the game, or is determined according to a battle result of a current season.

18. The electronic device according to claim 15, wherein the target task is an invitation task sent by a second game character belonging to the first camp, and the processor, through executing the machine-readable instruction, is specifically configured to:

determine, in response to the first game character accepting the invitation task, that the first game character belongs to the first camp.

* * * * *